(12) United States Patent
Abrams et al.

(10) Patent No.: US 7,007,616 B2
(45) Date of Patent: Mar. 7, 2006

(54) OXYGEN-BASED BIOMASS COMBUSTION SYSTEM AND METHOD

(75) Inventors: Stan E. Abrams, Castle Rock, CO (US); Brian Culvey, Englewood, CO (US)

(73) Assignee: Nathaniel Energy Corporation, Englewood, CO (US)

( * ) Notice: Subject to any disclaimer, the term of this patent is extended or adjusted under 35 U.S.C. 154(b) by 0 days.

(21) Appl. No.: 10/812,393

(22) Filed: Mar. 30, 2004

(65) Prior Publication Data

US 2005/0022553 A1 Feb. 3, 2005

Related U.S. Application Data

(63) Continuation-in-part of application No. 10/331,559, filed on Dec. 31, 2002, and a continuation-in-part of application No. 10/061,362, filed on Feb. 4, 2002, now Pat. No. 6,532,879, and a continuation-in-part of application No. 09/138,020, filed on Aug. 21, 1998, now abandoned.

(60) Provisional application No. 60/458,377, filed on Mar. 31, 2003.

(51) Int. Cl.
*F23B 7/00* (2006.01)
*F23L 7/00* (2006.01)

(52) U.S. Cl. .......................... 110/342; 110/348; 110/242; 110/234

(58) Field of Classification Search ................ 110/116, 110/342, 348, 233, 234
See application file for complete search history.

(56) References Cited

U.S. PATENT DOCUMENTS

| | | | |
|---|---|---|---|
| 2,389,077 A | * | 11/1945 | Peterson et al. ............ 110/228 |
| 3,647,405 A | * | 3/1972 | Smith ...................... 110/234 X |
| 3,977,844 A | | 8/1976 | Van Slyke |
| 4,091,748 A | * | 5/1978 | Mansfield ............... 110/234 X |
| 4,109,590 A | * | 8/1978 | Mansfield .................. 110/235 |
| 4,119,046 A | * | 10/1978 | Adams .................... 110/297 X |
| 4,263,857 A | * | 4/1981 | Ban ........................ 110/348 X |
| 4,315,468 A | * | 2/1982 | Tyer et al. .............. 110/188 X |
| 4,356,778 A | * | 11/1982 | McRee, Jr. ............. 110/234 X |
| 4,362,269 A | * | 12/1982 | Rastogi et al. .......... 110/188 X |
| 4,385,567 A | * | 5/1983 | Voss .......................... 110/186 |
| 4,395,958 A | * | 8/1983 | Caffyn et al. ........ 110/185 R X |
| 4,417,528 A | * | 11/1983 | Vining et al. ........... 110/185 X |
| 4,528,917 A | * | 7/1985 | Jacobs ............. 110/101 CF X |
| 4,598,670 A | * | 7/1986 | Clamser et al. ......... 110/186 X |
| 4,624,192 A | * | 11/1986 | Mansfield ............... 110/270 X |
| 4,676,177 A | * | 6/1987 | Engstrom ............... 110/229 X |
| 4,765,256 A | * | 8/1988 | Caughey ..................... 110/229 |

(Continued)

FOREIGN PATENT DOCUMENTS

FR 2500122 * 8/1982 ................. 110/186

(Continued)

*Primary Examiner*—Kenneth Rinehart
(74) *Attorney, Agent, or Firm*—Jim Zegeer

(57) ABSTRACT

An oxygen-based biomass solid fuel combustion system and method has an air separator for separating oxygen from air providing a supply of oxygen for feeding oxygen to a solid fuel combustion chamber. An airlock feeds a metered amount of solid fuel to the solid fuel combustion chamber. A burner stage having a firetube for collecting fuel gases from the solid fuel combustion chamber combusts the collected fuel gases with further oxygen from the separator and heats a boiler to generate steam. A heat utilization device (e.g. an electrical generator) may be connected to the steam boiler. Nitrogen-free diluent gases (e.g. argon and carbon dioxide) are used to control combustion process temperatures. The usable heat energy and useful byproducts are extracted from the different stages of the process.

8 Claims, 11 Drawing Sheets

U.S. PATENT DOCUMENTS

| | | |
|---|---|---|
| 4,829,911 A | 5/1989 | Nielson |
| 4,848,249 A * | 7/1989 | LePori et al. ............ 110/229 X |
| 4,878,440 A * | 11/1989 | Tratz et al. ............. 110/234 X |
| 4,900,401 A * | 2/1990 | Horton .................. 110/229 X |
| 4,917,023 A * | 4/1990 | Jones .................... 110/204 X |
| 4,953,477 A * | 9/1990 | Martin ....................... 110/190 |
| 5,030,054 A | 7/1991 | Reschly et al. |
| 5,101,740 A * | 4/1992 | Abril ..................... 110/229 X |
| 5,207,176 A | 5/1993 | Morhard et al. |
| 5,261,337 A * | 11/1993 | Orita et al. ............. 110/188 X |
| 5,279,234 A * | 1/1994 | Bender et al. .......... 110/229 X |
| 5,284,103 A * | 2/1994 | Hand et al. ................. 110/255 |
| 5,606,924 A * | 3/1997 | Martin et al. ........... 110/190 X |
| 5,657,706 A * | 8/1997 | Liagre et al. ............... 110/250 |

FOREIGN PATENT DOCUMENTS

| | | | |
|---|---|---|---|
| JP | 56-25609 | * 3/1981 | |
| JP | 57-207721 | * 12/1982 | |
| JP | 8-288529 A | * 10/1994 | ................. 110/186 |

* cited by examiner

OXYGEN-BASED BIOMASS COMBUSTION SYSTEM AND METHOD

REFERENCE TO RELATED APPLICATION

The present application is the subject of provisional application No. 60/458,377 filed Mar. 31, 2003 entitled WASTE ENERGY SYSTEM WITH ZERO EMISSION. This application is also a continuation-in-part application of application Ser. No. 09/138,020 filed Aug. 21, 1998 entitled GASIFIER SYSTEM AND METHOD (now abandoned) and application Ser. No. 10/061,362 filed Feb. 4, 2002, now U.S. Pat. No. 6,532,879 and a continuation-in-part application of application Ser. No. 10/331,559 filed Dec. 31, 2002.

BACKGROUND AND BRIEF DESCRIPTION OF THE INVENTION

The present invention relates to a gasifier system and method for the efficient conversion of solid fuel waste materials (tires, etc.) and biomass materials into usable energy and useful products.

DESCRIPTION OF THE PRIOR ART

The prior art is best exemplified by U.S. Pat. No. 5,284,103 entitled BIO-MASS BURNER CONSTRUCTION by Hand et al, which is a division of U.S. Pat. No. 5,178,076 entitled BIO-MASS BURNER CONSTRUCTION issued Jan. 12, 1993 to the same inventors. In these patents, the burner utilizes a first burning chamber having a falling fuel entrained bed zone positioned above a traveling grate having a porous metallic woven belt. Primary air is directed through the porous belt to establish an oxygen-starved first burning chamber. A second burning chamber in fluid communication with the first burning chamber has a restricted diameter and effectively provides a hot-air gas nozzle. In larger sized units, a plurality of conveyors constitutes the traveling grate with the conveyors being arranged in head-to-head stepped relationship so that unburned fuel received by gravity from the entrained bed zone is agitated or jostled to enhance its burning.

Reference is made to the following prior art patents:

| | |
|---|---|
| 4,749,383 | Mansfield et al. |
| 4,385,567 | Voss |
| 5,279,234 | Bender et al. |
| 3,853,498 | Bailie |
| 5,589,588 | McMullen et al. |
| 4,109,590 | Mansfield |
| 4,244,180 | Rasor |
| 4,276,120 | Lutz |
| 4,448,599 | Cheng |
| 4,624,192 | Mansfield |
| 4,829,911 | Nielson |
| 4,838,183 | Traveras et al. |
| 5,081,940 | Motomura et al. |
| 5,105,747 | Khinkis et al. |
| 5,588,378 | Mancini |
| 5,727,482 | Young |

BRIEF SUMMARY OF THE INVENTION

According to the present invention, firebelts ensure that the heat loss from heating unnecessary oxidant is minimized. The quantity of oxygen at each point in the combustion process is closely controlled. This oxygen control benefits the combustion process in three ways:

First, by minimizing the heat loss of the combustion process, this minimizes the amount of carbon monoxide and volatile organic carbons (VOC) that are produced. Carbon monoxide and VOC, priority pollutants, are produced indirectly proportional to the combustion temperature. Therefore, by maximizing the combustion temperature, the quantity of carbon monoxide and VOCs produced are minimized.

Secondly, nitrogen oxides, another priority pollutant, is produced by combining the nitrogen in the air with the oxygen. This combination of nitrogen and oxygen only occurs at high temperatures and when nitrogen is present. The higher the temperature and the greater the nitrogen content of the gases, the greater the quantity of nitrogen oxides that are produced. While the combustor of the present invention utilizes high temperatures, the formation of nitrogen oxides is eliminated since there is no nitrogen in the oxidant and diluent to combine with the oxygen. All the oxygen is used in the combustion process.

Thirdly, by minimizing the amount of air supplied to the combustion process, the amount of energy required to move gas in the combustor and ancillary is minimized. Electrical energy costs are typically 20–50% less than similar combustion systems where the air is used.

A further feature of the present invention is in the use of reflected infrared energy. Heat is a form of electromagnetic energy similar to light where the rays can be refracted or reflected. Radiation produced from heat is of a longer wavelength than visible light and is called infrared rays. By reflecting a certain amount of the heat produced from a combustion process, this invention is able to supply heat to the gasification process. The reflected heat will be of benefit in two ways:

Firstly, the heat is reflected to a point where the heat can be used to assist the combustion process. This is generally where the fuel first enters the combustion process. At this point, the fuel must be heated and the water removed. These processes require addition of energy that can be added for heat of the combustion of a part of the fuel or from the reflected energy. Using a part of the fuel to preheat the remaining fuel is inefficient, leaving less total heat available for production of electricity. Using reflected heat removes or minimizes this inefficiency. The second way this benefits the overall combustion process is in that the energy is transferred in a beneficial way—not wasted by irradiating and heating the combustion chamber. Heat that is absorbed by the combustion chamber shell is generally wasted since there is no direct benefit from this radiation. A small portion is used in the maintenance of the necessary combustion temperature but the majority of irradiating heat is wasted as low-level heat irradiating from the combustor exterior. Reflective heat added to the fuel will benefit the overall combustion efficiency, and this is a feature of the present invention Another feature of the invention is that the speed of the conveyor drive and the rate of inlet oxidant and diluent addition and the control of those gases is much more closely controlled so as to achieve high efficiency. Still another feature of the invention is that the fuel feed ramping is based on thermal conditions at the boiler output.

Still another feature of the invention is that the induced draft fan control is based on the draft pressure and boiler airflow rate.

Finally, the invention features a control system which is based on operational parameters sensed at different stages in the process.

Accordingly, the object of the invention is to provide an improved gasifier system.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
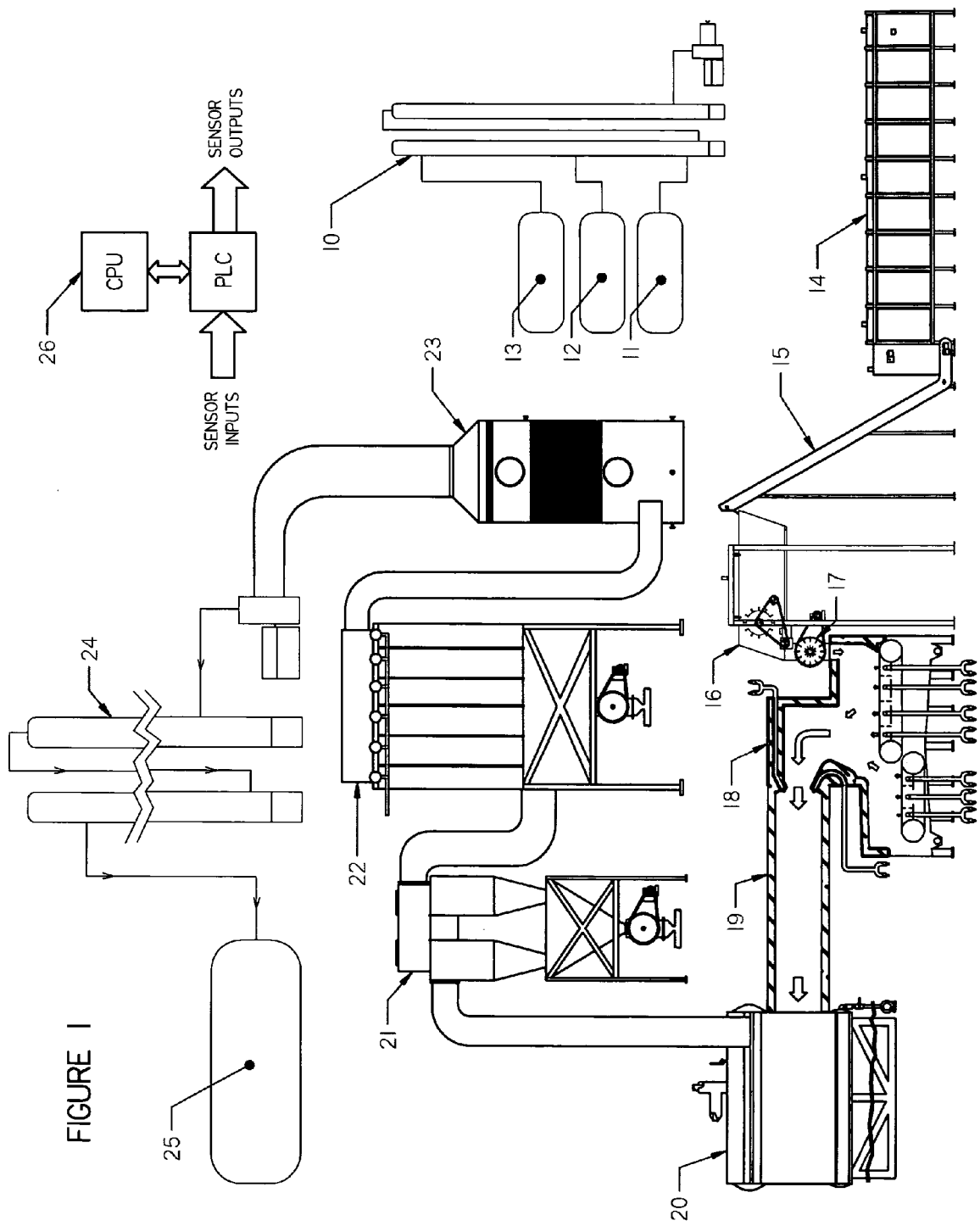
FIG. 1 is a diagrammatic sectional illustration of a gasifier system incorporating the invention.
Figure 9A:
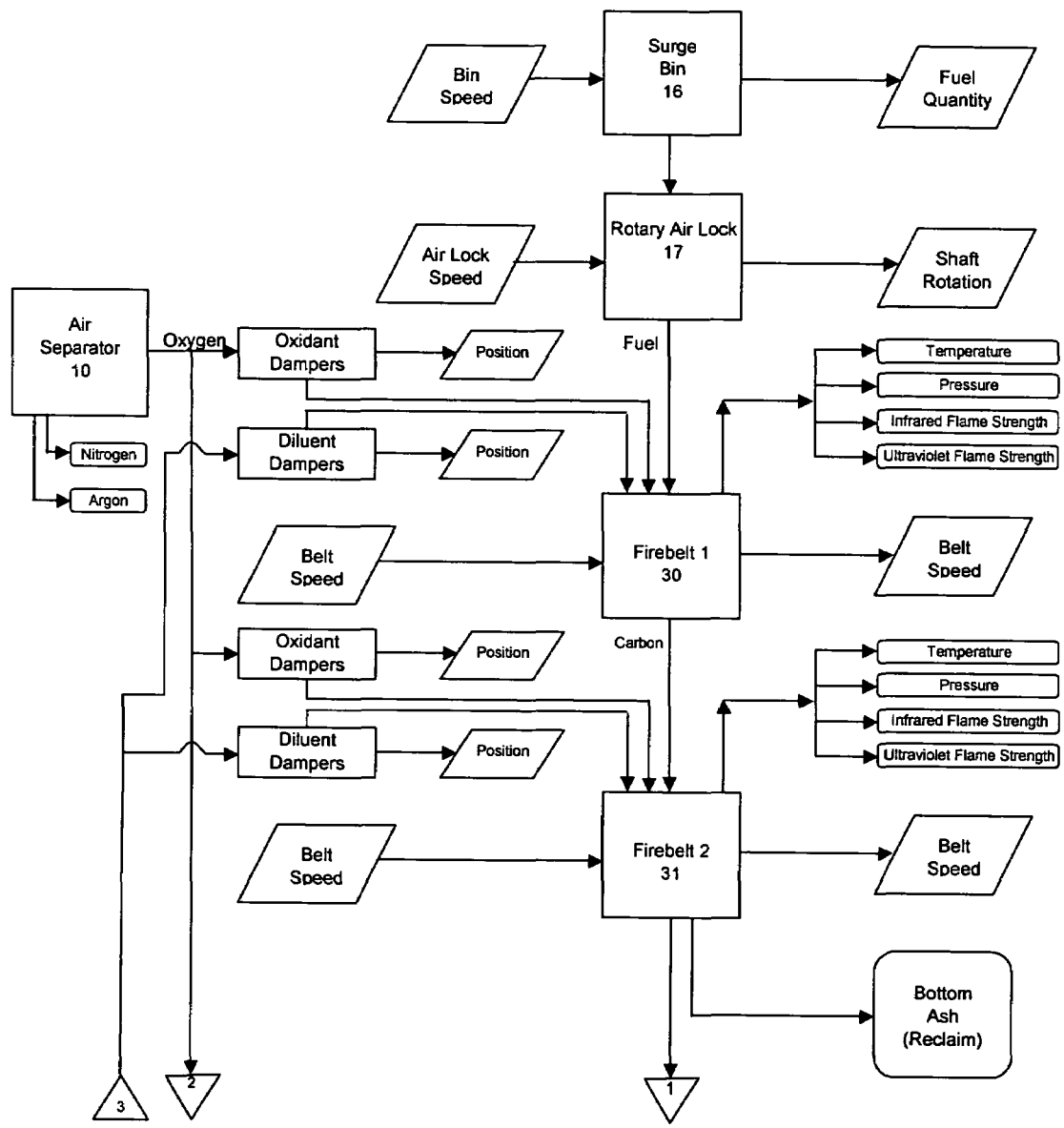
FIGS. 9A, 9B and 9C are flow diagrams illustrating the combustion process and location of various sensors and control elements incorporated in the invention.
Figure 9B:
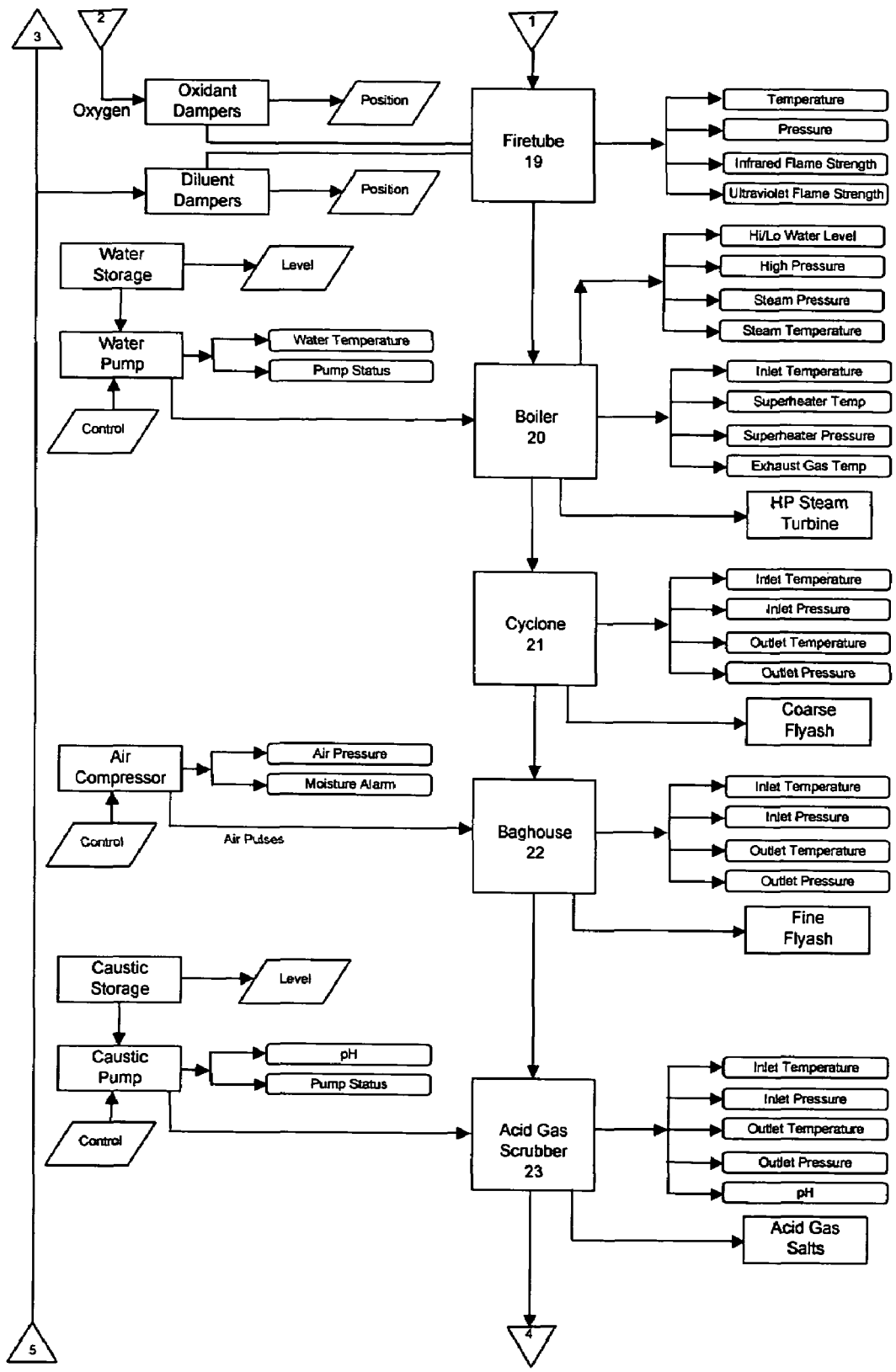
Figure 9C:
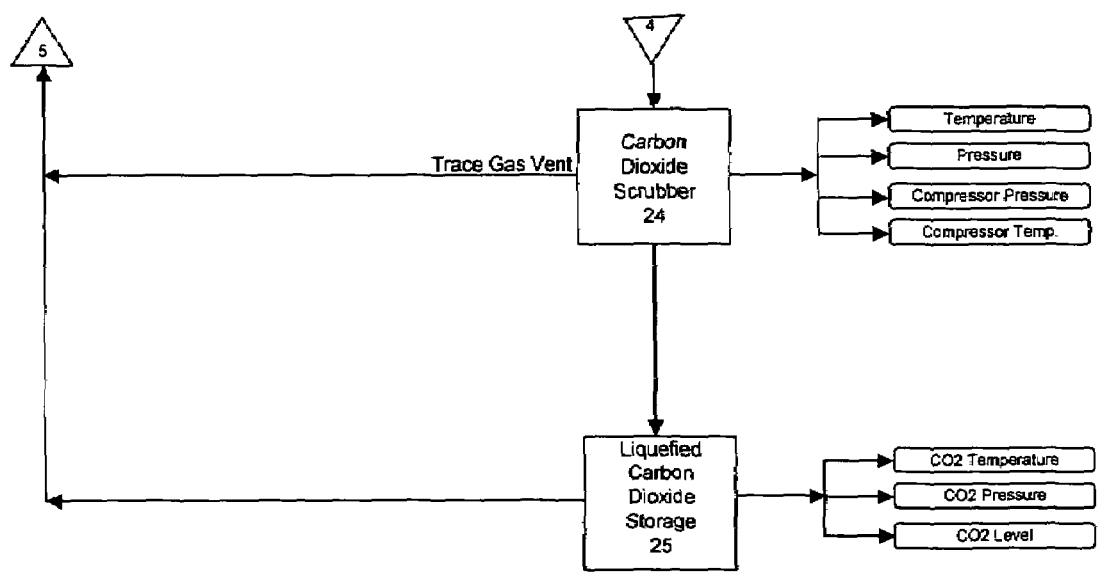

Referring now to FIG. 1, the gasifier system comprises an air separator unit 10, gas storage for oxygen 11, nitrogen 12, argon 13, a solid fuel storage unit 14 and fuel transport conveyor 15, inlet feed conveyor 16 and fuel metering unit 17, a gasifier 18, a gasifier firetube with connection to boiler 19, the boiler itself 20, a cyclone 21, baghouse 22, acid gas scrubber 23, carbon dioxide scrubber 24, carbon dioxide storage system 25, and control system 26 which is diagrammatically illustrated in FIGS. 9A, 9B and 9C.

Figure 2:
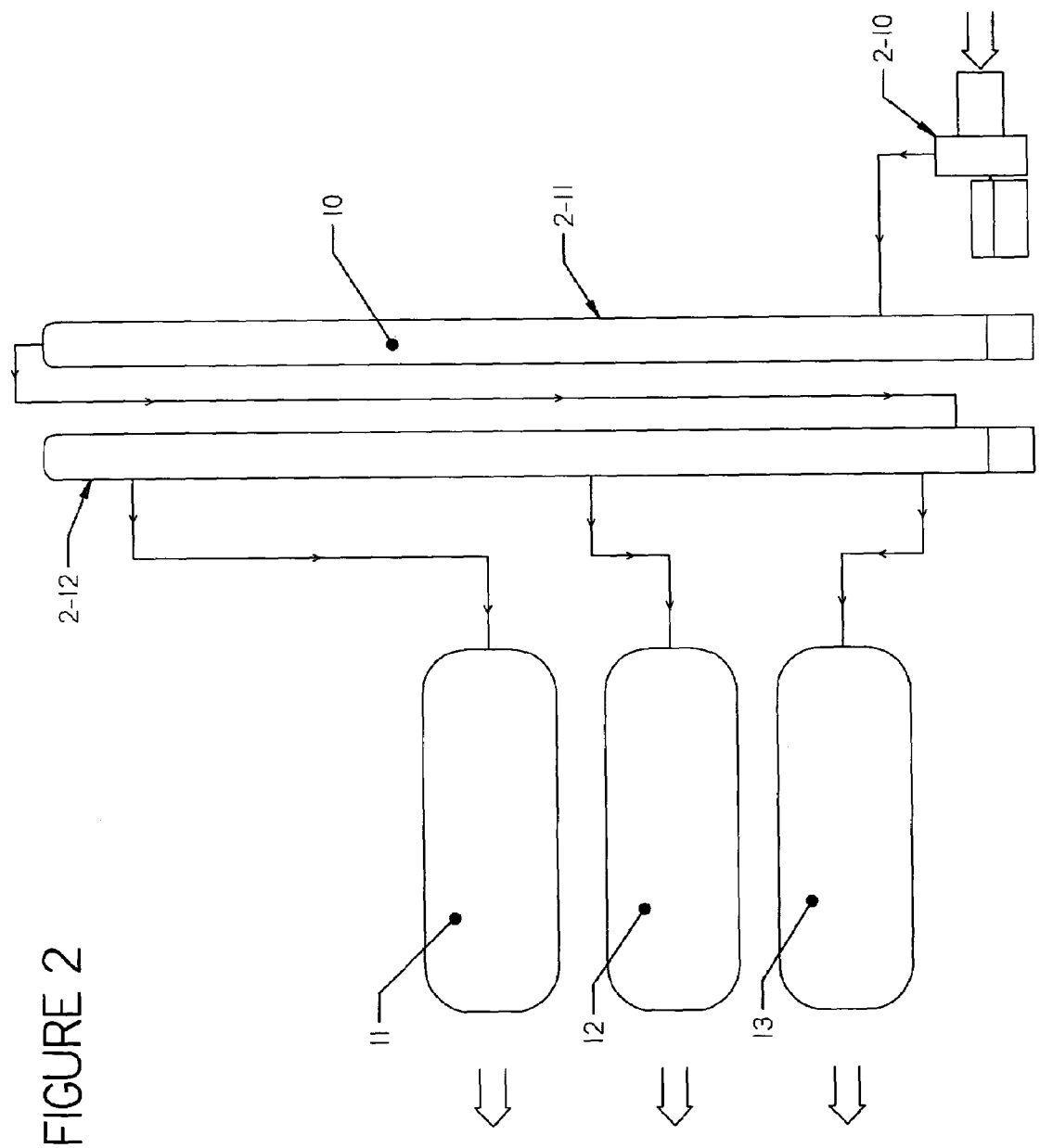
FIG. 2 is a diagrammatic illustration of an air separator unit incorporated in the invention to separate and purify the oxygen used as an oxidant in the combustor unit.

Air Separator Unit 10 (FIG. 2)

The air separator unit 10 separates air into its components parts; oxygen, nitrogen and argon. Trace gases normally present in air are vented. Gaseous air is compressed by a turbine compressor 2-10 and passes into condensing column 2-11 where the compressed gases are cooled and condensed into liquids. The liquids then pass into a fractionating tower 2-12 where they are heated and separated by their boiling points. The separated, purified gases are collected in pressure vessel 11 as purified oxygen, pressure vessel 12 as purified nitrogen and pressure vessel 13 as purified argon. The process uses the oxygen while the nitrogen and argon are available as industrial commodities.

Figure 3:
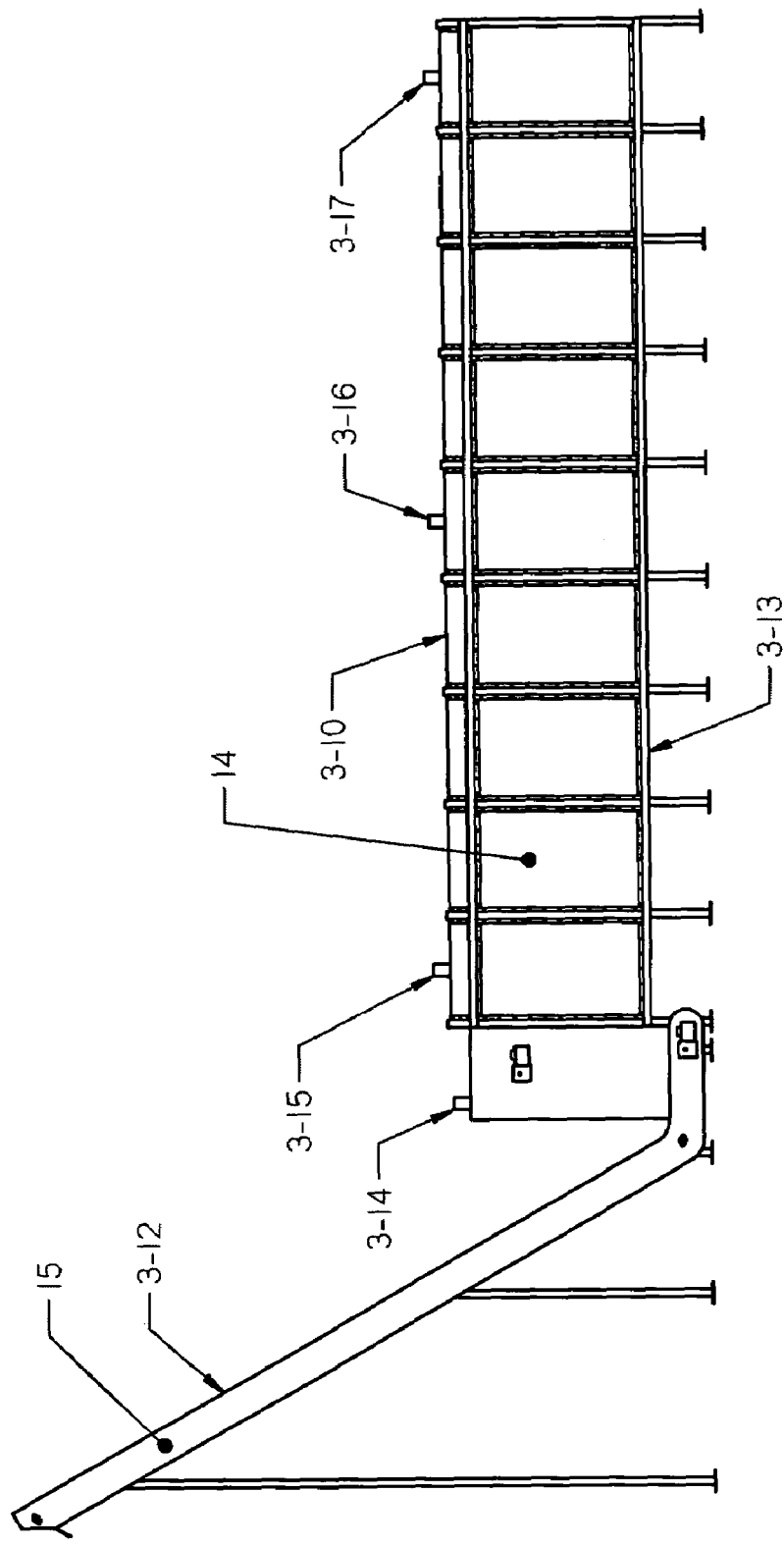
FIG. 3 is a cross-sectional illustration of a walking floor trailer and inclined conveyor incorporated in the invention for feeding fuel to the combustor unit.

Walking Floor Trailer 14 and Inclined Conveyor 15 (FIG. 3)

The walking floor trailer 3-10 is used to store and deliver fuel to the combustor with the inclined conveyor. The bin conveyor 3-11 monitors the amount of fuel and calls for additional fuel from the walking floor trailer when necessary.

The walking floor trailer 3-10 is conventional and works in the following manner: The floor 3-13 is comprised of a number of strips that independently move. To move the fuel to the rear of the trailer (left end in FIG. 3), the strips all move together rearward. At the end of the cycle (approximately four inches), each strip independently moves forward, leaving the fuel undisturbed. This cycle is repeated as required to move the fuel rearward as much as necessary. A monitor or sensor 3-14 is located at the input end of inclined conveyor 15 and monitors the quantity of fuel located at the end of the trailer (the beginning of the inclined conveyor) and moves the fuel rearward in the walking floor trailer as required to maintain sufficient fuel in the inclined conveyor. Sensors 3-15, 3-16 and 3-17, similar to sensor 3-14 are used to monitor fuel quantity along the length of the walking floor trailer to insure there is sufficient fuel in the trailer.

Figure 4:
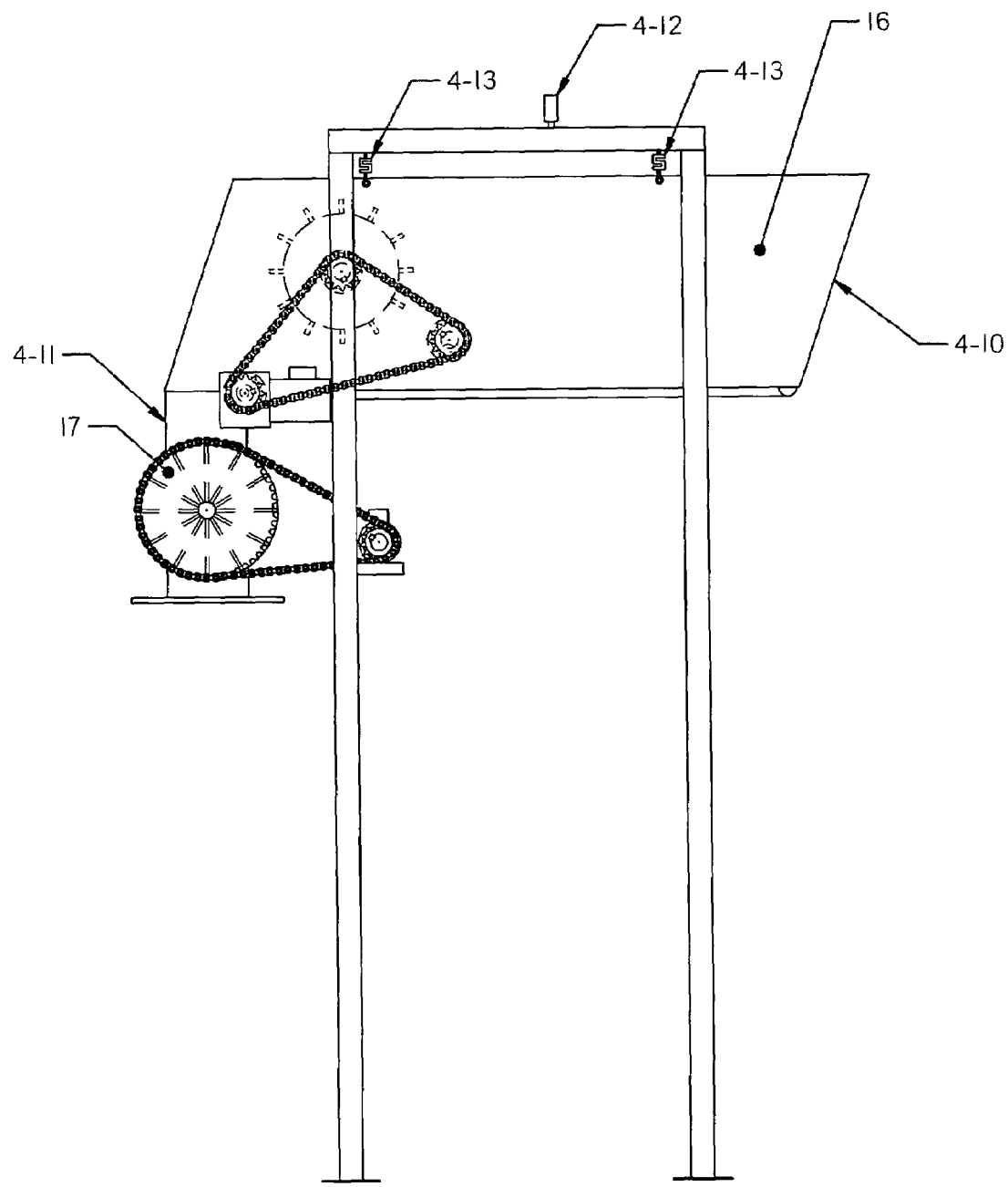
FIG. 4 is a diagrammatic illustration of the bin feeder and rotary air lock incorporated in the invention.

Bin Feeder 16 and Rotary Air Lock 17 (FIG. 4)

The bin feeder 4-10 receives the fuel from the inclined elevator 15 (FIG. 3). The bin feeder is used to meter the fuel to the combustor. Depending upon the quantity of fuel required by the combustor to produce sufficient steam, the bin feeder 4-10 speed will be varied to introduce sufficient fuel to the combustor. A monitor or sensor 4-12 is used on the bin feeder to ensure that sufficient fuel is present on the bin feeder belt. If additional fuel is needed, a signal is sent to the inclined conveyor/walking floor trailer (FIG. 3) for additional fuel. Load cells 4-13 are used to calculate the fuel weight per unit time that is introduced to the combustor.

The rotary air lock 7 is used to provide a mechanical seal in chute 4-11 to minimize the quantity of unwanted air introduced into the combustor.

Gasifier 18

The fuel gasification process takes place in gasifier 18 shown in FIG. 1 device. This process is described hereafter in the section entitled "COMBUSTION PROCESS DESCRIPTION". The area of this gasification is referred to as stage 1. The gasification in this stage is controlled totally by the control system by taking the following parameters and the system computer 26 determines the variables that need to change or remain the same during the gasification process:

Stage 1a:
Solid fuel feed rate,
Oxidant flow rate,
Diluent flow rate,
Firebelt 30 speed,
Gasification temperature,
Draft pressure,
Infrared flame strength,
Ultraviolet flame strength.

Stage 1b:
oxidant flow rate,
Diluent flow rate,
Firebelt 31 speed,
oxidation temperature,
Draft pressure,
Firebelt (Conveyor) Air Flows,
Infrared flame strength,
Ultraviolet flame strength.

The pure oxygen and carbon dioxide as a diluent through the firebelts (conveyors) 30, 31 is the primary reason for the ability to eliminate air emissions from the combustor disclosed herein. Controlling the amount of oxidant 5-11 (firebelt-1 30), 5-13 (firebelt-2 31) and diluent 5-12 (firebelt-1 30), 5-14 (firebelt-2 31) that passes through each unit area of the firebelts governs the quantity and quality of the combustion process.

The combustion process requires two components; fuel and an oxidizer. Normally, air is used as an oxidizer but air contains many gases, most of which do not contribute to the oxidation process. In fact, the other gases in air can have a deleterious effect on the overall combustion efficiency and the production of air pollutants emitted to the atmosphere. Therefore, only pure oxygen is used as an oxidant and carbon dioxide is used as a diluent to eliminate the potential for formation of untreatable air pollutants.

The entire combustion process is a series of discrete steps where heat is either created or it is used. In general, the following steps occur in the solid fuel combustion process:

| Firebelt 30 | |
|---|---|
| Heat solid fuel to operating temperature | requires energy |
| Remove adsorbed water from solid fuel | requires energy |
| Heat combustion air to operating temperature | requires energy |
| Gasify fuel components in solid fuel | requires energy |
| Decompose fuel gases into elemental fuels | requires energy |
| Reflected heat from firebelt 21 | produces energy |
| Combust small percentage of solid fuel for heat | produces energy |
| Net energy: | produces very little energy |
| Heat loss: | negligible |
| Firebelt 31 | |
| Heat combustion air to operating temperature | requires energy |
| Additional heating of fuel and ash from 1,500. degree. F. to 2,500. degree. F. | requires energy |
| Reflect heat to firebelt 20 | requires energy |
| Combust carbon into carbon monoxide | produces energy |
| Preheat air from hot bottom ash | produces energy |
| Net energy: | produces little energy |
| Heat loss: | small - hot bottom ash |
| Firetube 19 | |
| Heat combustion air to operating temperature | requires energy |
| Additional heating of fuel and ash from 2,500. degree. F. to 4,000. degree. F. | requires energy |
| Combust fuels | produces energy |
| Preheat combustion air from combustor refractory | produces energy |
| Net energy: | produces significant energy |
| Heat loss: | negligible |
| Boiler Superheater | |
| Heat transferred to steam | requires energy |
| Net energy: | requires significant energy |
| Heat loss: | negligible |
| Boiler 11 | |
| Heat transferred to boil water | requires energy |
| Net energy: | requires significant energy |
| Heat loss: | negligible |
| Boiler Preheater | |
| Heat transferred to water | requires energy |
| Net energy: | requires significant energy |
| Heat loss: | negligible |
| Cyclone 21 | |
| Heat lost via radiant heating | produces energy |
| Heat lost in fly-ash | produces energy |
| Net energy: | produces unusable energy |
| Heat loss: | significant |
| Baghouse 22 | |
| Heat loss via radiant heating | produces energy |
| Heat lost in fly-ash | produces energy |
| Net energy: | produces unusable energy |
| Heat loss: | significant |
| Acid Gas Scrubber 23 | |
| Heat loss via radiant heating | produces energy |
| Heat lost in quenching gas with caustic solution | produces energy |
| Net energy: | produces unusable energy |
| Heat loss: | significant |
| Carbon Dioxide Scrubber 24 | |
| Heat loss via radiant heating | produces energy |
| Heat loss via compressive heating | produces energy |
| Heat lost in cryogenic chilling | produces energy |
| Net energy: | produces unusable energy |
| Heat loss: | significant |
| Heat Balance | |
| Heat Produced | 100% |
| Heat used to produce steam | 88% |
| Heat loss through radiant convection | 10% |
| Heat loss from ash | 2% |
| Heat loss through combustor, fire tube and boiler | <0.001% |

To ensure that the heat loss from heating unnecessary oxidant and diluent is minimized, the quantity of oxygen and carbon dioxide at each point of the combustion process is stringently controlled. This control benefits the combustion process in three ways.

The first way is by minimizing the heat loss in the combustion process. This minimizes the amount of carbon monoxide produced. Carbon monoxide, a priority pollutant, is produced indirectly proportional to the combustion temperature. Therefore, by maximizing the temperature while maintaining a slight excess of oxygen, the quantity of carbon monoxide is minimized to the point of non-detection. Second, nitrogen oxides, another priority pollutant, is produced by combining the nitrogen in air with the oxygen in the air. This combination of nitrogen and oxygen only occurs at high temperatures and when nitrogen is present. The higher the temperature, the greater the quantity of nitrogen oxides that is produced and the greater quantity of nitrogen present, the greater the potential for nitrogen oxide formation. While the combustor disclosed herein utilizes very high temperatures, the formation of nitrogen oxides is eliminated since there is no nitrogen to combine with the oxygen. All of the oxygen is used in the combustion process.

Third, by minimizing the amount of oxidant and diluent supplied to the combustion process, this also minimizes the amount of energy required to move the gases in the combustor. Electrical energy costs are typically 20–50% less than similar combustion systems where the air is used.

Reflection of Infrared Energy

Heat reflection is another innovative feature of the combustor of this invention. Heat is a form of electromagnetic energy, similar to visible light where the rays can be refracted or reflected. Radiation produced from heat is of a longer wavelength than visible light and is called infrared rays.

By reflecting a certain amount of the heat produced from the combustion process, additional heat is supplied to the gasification process. The reflected heat will be of benefit in two ways:

The first way is that by the heat reflected to a point where the heat can be used to assist the combustion process. This is generally where the fuel first enters the combustion process. At this point, the fuel must be heated and the water removed. These processes require the addition of energy that can be added from either the combustion of a part of the fuel or from the reflected energy. Using a part of the fuel to preheat the remaining fuel is inefficient, leaving less total heat available for the production of electricity. Using the reflected heat removes or minimizes this inefficiency.

The second way reflected heat benefits the overall combustion process is that the energy is transferred in a beneficial way and is not wasted by irradiating and heating the combustion chamber shell. Heat that is absorbed by the combustion chamber is generally wasted since there is no direct benefit from this radiation. A small portion is used in the maintenance of the necessary combustion temperature, but the majority of the radiative heat is wasted as low level heat radiated from the combustor exterior. The reflection of the heat back onto the fuel will benefit the overall combustion efficiency.

Gasifier Firetube with Connection to Boiler 19

This is actually a part of the gasifier and is referred to as stage 2. It is the connecting tube to the boiler 20. Oxidant and diluents 5-15 and 5-16 are preheated in annular spaces 5-18 in the refractory of the gasifier and injected at a rate dictated by the control system. When this oxygen meets the gas from the gasifier, ignition takes place in the firetube and thus enters the boiler. The following parameters are taken in the firetube for the control system's use:

Stage 2:
Oxygen and diluent flow rate,
Oxygen concentration,
Carbon monoxide concentration,
Firetube draft pressure,
Firetube temperature,
Boiler draft pressure,
Boiler temperature.

Boiler 20 (See FIG. 9B)

The boiler 20 (FIG. 5) converts the thermal energy to steam. The following parameters (see FIG. 9B) are taken in the boiler for the control system 26 use for control of the feed rate and the steam output:
Oxygen and diluent flow rate,
Steam pressure,
Steam temperature.

The boiler 5-10 (20) used in this embodiment of the invention is a D-frame boiler. Other types of boilers such as A-frame, H-frame may be used in other installations.

The boiler 5-10 absorbs the heat produced from the combustion of the fuel and transfers it to water, which is converted into steam. The steam is used to produce mechanical work such as electrical generation, heating, etc.

An economizer may be attached after the boiler to preheat the water and improve efficiency. This is not shown in this embodiment.

Cyclone 21 & Baghouse 22

The cyclone 21 (FIG. 6) is the first mechanical device that removes particulate. The design of the cyclone is such that when the exhaust gases flow through it from the boiler the largest particulate will drop from the flow through the bottom of the cyclone to a storage container. The following parameters are measured (see FIG. 9B) for the control system 26 in the cyclone:
Inlet temperature 6-12,
Inlet pressure 6-13,
Outlet temperature 6-14,
Outlet pressure 6-15.

The cyclone outlet temperature and pressure are also used for the baghouse inlet.

The cyclone 6-10 and baghouse 6-11 operate as particulate collection devices. In the combustion process, as the fuel is combusted a small percentage of ash remains. Some of this ash is entrained within the combustion gas stream and is carried along with the exhaust gases, called fly-ash. The cyclone 6-10 and baghouse 6-11 remove the fly-ash so that it is not emitted into the atmosphere.

The cyclone acts through centripetal action. The gas spins around in the cyclone and separates the heavy particles from the gas based upon weight. The ash particles are collected at the bottom of the cyclone and removed through a rotary air lock 6-18 and a vacuum removal system (eductor) 6-19.

The baghouse 6-11 operates on a different principle. The gas passes through a series of fiberglass bags 6-22 that have very small openings within them. The gas can pass through but the particles cannot and remain collected on the exterior of the bag. At appropriate intervals, high-pressure air is introduced inside the bags. This air literally forces the particles off of the bags and they fall to the bottom of the baghouse. The particles then are collected through a rotary air lock 6-20 and an eduction system 6-21 similar to the cyclone.

The cycle acts through centripetal action. The particles are collected on the surface of the bags and are removed by high-pressure air pulse mainfold 6-23 delivered countercurrent through the bag material which causes the adhered particles to fall off. The ash particles are collected at the bottom of the baghouse and removed through a rotary air lock 6-20 and a vacuum removal system (eductor) 6-21.

The baghouse 22 (FIG. 6) is the final removal equipment for particulate. The mesh size of the bags will be determined by the particulate discharge requirements. The following parameters are taken in the baghouse for the control system use:
Inlet temperature 6-14,
Inlet pressure 6-15,
Outlet temperature 6-15,
Outlet pressure 6-17.

The baghouse inlet temperature and pressure are also used for the cyclone outlet.

Acid Gas Scrubber 23

The acid gas scrubber 7-10 (FIG. 7) is used to remove acid gases from the exhaust gas stream. A mixture of lime (calcium oxide, a strong caustic) or sodium hydroxide (lye, a very strong caustic) and water is sprayed 7-11 through the exhaust gas. This liquid chemically reacts with the acid gases such as sulfur dioxide, hydrogen chloride, etc. to remove the acid gases. Plastic or ceramic open-frame balls 7-12 are often used as packing to increase the surface area of the contact surface to improve the efficiency of the chemical reaction. After the liquid has reacted with the gas, the gas stream passes through a series of impediments, called demisters 7-13 to remove all excess liquid. The cleaned gas then proceeds to the carbon dioxide scrubber.

After the liquid has reacted with the acid gases, it is collected in a spent slurry collector 7-14 and returned for treatment-to a source by a pump where it is sent to a separation chamber and the caustic solution recycled.

The scrubber 7-10 (FIG. 7) cleans the acid gases from the air stream. It is usually a wet or dry caustic system depending on the carbon dioxide scrubber requirements. The following parameters are taken for the control system that then determines the feed rate for the caustic agent: pH 7-15

Cleaned exhaust gases consisting of almost pure carbon dioxide is fed by fan to the carbon dioxide scrubber 24.

Figure 8:
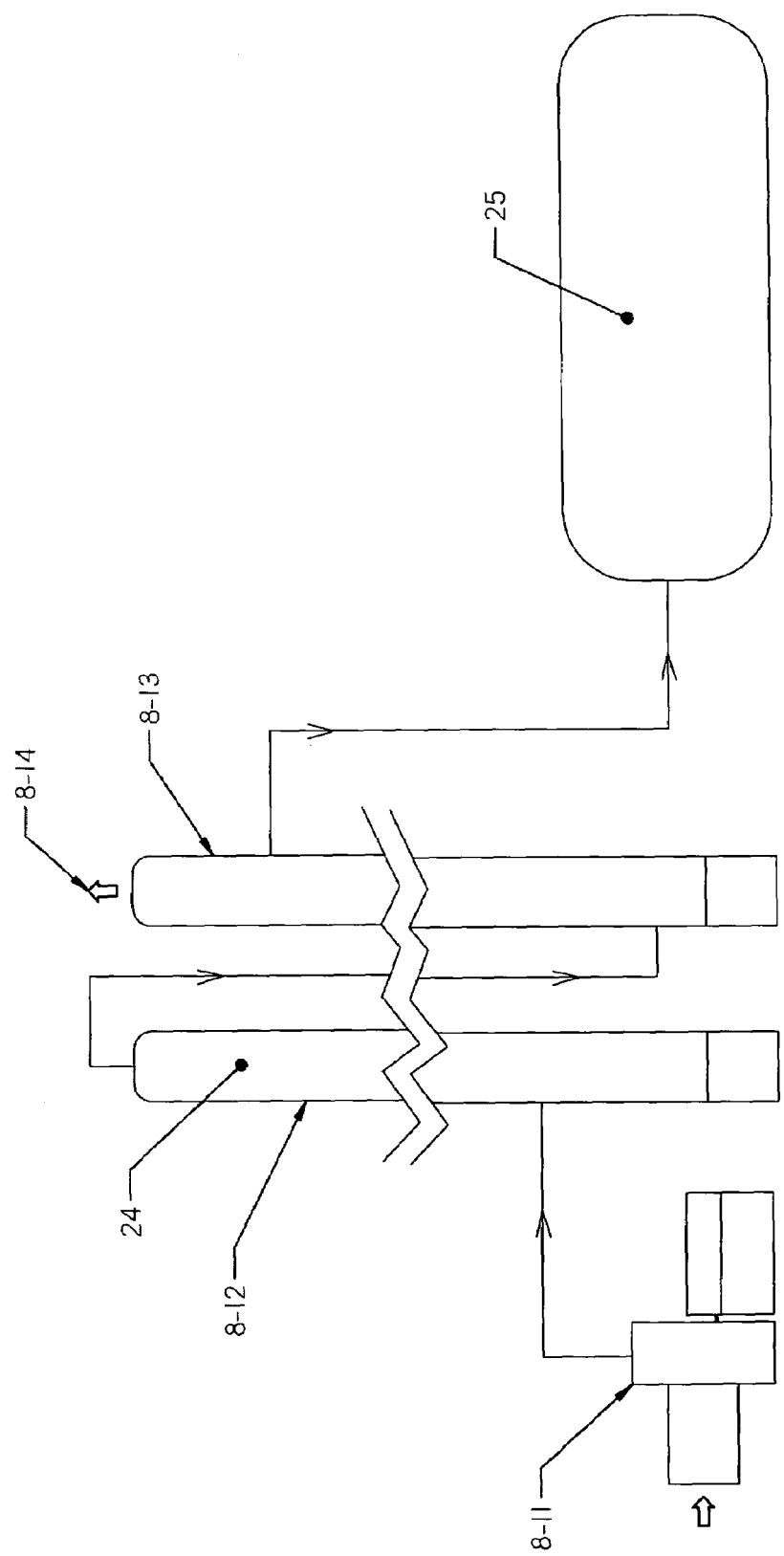
FIG. 8 is a diagrammatic illustration of the carbon dioxide scrubber for removing carbon dioxide from the gas stream.

Carbon Dioxide Scrubber 24 (FIG. 8)

The carbon dioxide scrubber 8-10 cryogenically removes carbon dioxide from the remaining gas stream. The acid gas scrubber exhaust is compressed by a turbine compressor 8-11 and passes into condensing column 8-10 where the compressed gases are cooled and condensed into liquid carbon dioxide and trace amounts of other gases not collected by the acid gas scrubber 23. The liquids then pass into a fractionating tower 8-12 where they are heated and the purified carbon dioxide removed. The separated, purified carbon dioxide is collected in pressure vessel 8-13. Trace amounts of acid gases and other inert gases are vented 8-14 and are returned to combustor 18 or the air separator unit 10 for recycling.

Control System 26

The control system (see flow charts in FIGS. 9A, 9B and 9C) is the determining factor for the gasification system to operate properly and to be in compliance with the regulatory requirements for air discharge. It includes Programmable Logic Controllers (PLC's) and variable speed drives, diagrammatically illustrated in FIGS. 9A, 9B and 9C, that operate the various motors, fans and drives that operate the gasifier system. The PLC'S are in turn controlled by signals from a computer that is programmed to recognize all the variables listed plus other minor items and to react properly from operator input. The program is designed to make adjustments for different types of fuels (with different BTU content) without changing equipment in the gasifier system.

Combustor Process Description

Thermodynamic Extraction of Chemical Potential Energy

The release of chemical potential energy is a two-stage process: Stage 1 gasifies the carbon-based solid fuels and stage 2 oxidizes the gasified fuels to produce heat.

Stage 1 is subdivided into two separate processes involved in the gasification of solid fuels. Stage 1a uses thermal decomposition of the solid fuel introduced into the combustor to break the fuel into gaseous fractions of lower molecular weight or elemental composition. All absorbed compounds in the fuel such as water and other solvents are released in this stage.

A polymerized hydrocarbon based fuel (plastic and lignin/cellulose base fuel) is decomposed into short chain aliphatic hydrocarbons, elemental carbon, carbon monoxide and hydrogen through the addition of energy as heat. Other elemental based polymers including sulfur and nitrogen based compounds are similarly broken into appropriate monomers or elements using the same process. The ash produced from Stage 1a is largely carbon char with small amounts of metal oxides.

The heat required for the endothermic decomposition of the fuel is produced from heat supplied from stage 1b and from limited oxidation of fuel in stage 1a. The oxidation of the solid fuel is limited in this stage by careful addition of pure oxygen to the combustion process in Stage 1a. The amount of oxygen injected into Stage 1a is controlled by the amount of oxidation required to maintain the minimum necessary decomposition temperature in this stage. Carbon dioxide is also added as a diluent to stage 1a to carry the gasification products to stage 2 and to provide sufficient cooling of the process to prevent overheating of the belt and refractory. The amount of oxygen and carbon dioxide injection in stage 1 is governed by the temperature of the gases exiting stage 1a and stage 1b.

Stage 1b utilizes an exothermic partial oxidation of the carbon in the ash to produce carbon monoxide and heat. This process is regulated by adding a sub-stoichiometric amount of pure oxygen to the carbon char to limit the reaction of carbon and oxygen to the production of carbon monoxide. Carbon dioxide is also added as a diluent to stage 1b to carry the resulting carbon monoxide to stage 2 and to provide sufficient cooling of the process to prevent overheating of the belt and refractory. The remaining solid ash consists entirely of metallic oxides.

The heat of reaction of the carbon oxidation is used in Stage 1a to decompose the fuel as previously described. Approximately 80% of the heat of reaction is utilized in this process with the remaining heat passing to stage 1b and stage 2.

Physical Process

Solid fuel is introduced to the combustor section 1a (firebelt 30) where gasification and moisture removal occurs. A minimal amount of oxygen is introduced to Section 1a to maintain the minimum gasification temperature necessary for the specific type of fuel used. Radiative energy from Section 1b, firebelt 31 is also added to the energy required for gasification.

The gases exiting this section consist of primarily carbon monoxide, hydrogen, hydrocarbons (short-chain and long-chain), elemental fixed-carbon and water vapor with minimal quantities of carbon dioxide. Only fuel-bound nitrogen is present in the gases since nitrogen-containing air is not used. The ash produced through the gasification process consists of carbon, long-chain, high-boiling-point hydrocarbons and metallic oxides.

Control of the gasification process is accomplished by modulation of the fuel feed rate, the quantity of oxygen introduced through firebelts as measured by the gas temperature and the speed of the firebelts. Oxygen injected into the solid fuel is minimized to prevent overheating of the oxygen/fuel reaction and to prevent complete oxidation of carbon to carbon dioxide. The firebelt speed is controlled so that the solid fuel has been completely gasified at the end of the belt and only carbon chars remain.

Carbon dioxide is injected along with the oxygen to act as a carrier of the gasification products and as a diluent to moderate the reaction temperatures. Modulation of the carbon dioxide is controlled by the gasification temperature, the firebelt 30 temperature, and the refractory temperature.

The carbon ash from firebelt 30 falls onto section 1b (firebelt 31) where additional oxygen, in decreasing quantities, is supplied to combust the carbon to carbon monoxide as well as decomposition of the long-chain hydrocarbons to carbon monoxide and hydrogen. Section 1b gases consist of carbon monoxide (40–55%), hydrogen (5–20%) with the balance of the gas being carbon dioxide. The ash remaining from this process consists of metallic oxides with trace quantities of carbon-based compounds. Trace amounts of fuel-bound nitrogen, fuel-bound sulfur and inert gases are also present in variable quantities depending upon the fuel composition. Oxygen content is minimized in stage 1b to prevent oxidation of the carbon to carbon dioxide. The firebelt speed is controlled to ensure complete oxidation of the ash just before the end of the belt.

Radiative energy produced from stage 1b is reflected off of the refractory walls onto section 1a where it is used to gasify the solid fuel. Control of the section 1b process is performed by the firebelt 31 speed, stage 1b temperature, control of the air to fuel ratio through firebelt 31 as measured by the oxygen concentration and by the overall draft (negative pressure) of the combustor system.

Stage 2 combustion occurs within the firetube and within the boiler where the carbon monoxide and hydrogen gases are oxidized to carbon dioxide and water by the addition of additional oxygen. The firetube is used for mixing of the oxygen and fuel gas and preliminary combustion with final combustion occurring within the boiler cavity.

The Stage 2 combustion process is controlled by the oxygen/fuel gas ratio, boiler temperature, firetube temperature, carbon monoxide concentration, oxygen concentration, carbon dioxide concentration and by the overall draft of the combustor system. Carbon dioxide is also added as a diluent to the combustion process to moderate the combustion temperatures to prevent overheating of the refractory and boiler components. Carbon dioxide addition is controlled by the firetube and boiler temperatures.

Pollution Control

The combustor of the invention is a remarkably simple combustion system, and this design eliminates the emission of air pollutants from the combustion of solid fuels. All potential air pollutants are removed before potential emission into the environment. This is not the case with other combustor systems currently on the market.

There are six different categories of air pollutants that the Environmental Protection Agency regulates in solid fuel combustion systems. The combustor disclosed herein has been specifically designed to eliminate each of these six categories of pollutants. Each of these six categories will be discussed individually.

Particulates

Particulates can potentially be released into the atmosphere from materials in the fuel which cannot be burned. Usually these particles are a chemical part of the fuel and when burned, recombine as small particles. Part of these particles agglomerate together in chunks which then collect in the bottom of the combustor and are removed as bottom ash. The remaining particles are carried in the flue gas.

These particles could be released into the atmosphere unless they are removed. In the combustor of this invention, the particles are removed by devices called a cyclone and a baghouse. The cyclone acts through centripetal action. The gas spins around in the cyclone and the heavy particles are separated from the gas based upon weight. The baghouse is a large chamber filled with cloth bags that collect the dust as the gas passes through them. The dust is then removed and the cleaned gas is processed for other contaminants.

The technology of cyclone and baghouse design and construction is well advanced. There have been very few refinements in the baghouse particulate removal system since the mid-1970's.

Nitrogen Oxides

Nitrogen oxides ($NO_X$) are produced by nitrogen combining with oxygen in the presence of high temperatures. Generally, the higher the temperature, the higher the quantity of nitrogen oxides produced. Because nitrogen oxides have been found to be a contributing factor in the destruction of ozone in the atmosphere, the emission of these compounds are regulated and must be minimized.

For most solid fuel combustion sources, air is used as a source of oxidant and therefore a system of reducing nitrogen oxides must be added to lower the nitrogen oxide emissions to an acceptable level. Typically this reduction system uses the injection of ammonia gas into the combustion system and a catalytic converter (similar to today's automobiles) to chemically react the nitrogen oxides and the ammonia to produce nitrogen gas and water. This is an expensive process, both in capital costs for the precious metal catalyst and for operating costs of ammonia injection. Additionally, another pollutant, ammonia, a highly toxic compound, can be introduced into the atmosphere that must be controlled.

This combustor design uses an entirely different method to reduce nitrogen oxides. By eliminating nitrogen in the combustion process, the formation of nitrogen oxides is eliminated. Nitrogen oxides cannot form if there is no nitrogen to combine with the oxygen. In the combustion process disclosed herein, only enough oxygen is added to the fuel to perform the necessary combustion of the fuel. Because there is no nitrogen, there are no nitrogen oxides produced. A small excess oxygen is added only at the very end of the combustion process to ensure complete combustion of the fuel. Using this process, very low concentrations of nitrogen oxides are produced since only fuel-bound nitrogen, generally only present in trace amounts, can produce nitrogen oxides.

Sulfur dioxide ($SO_2$) is produced by the fuel-bound sulfur combining with oxygen. Generally, the higher the concentration of sulfur in the fuel, the higher the quantity of sulfur dioxide produced. Because sulfur dioxide have been found to be a contributing factor in the formation of acid rain in the atmosphere, the emission of these sulfur dioxide must be minimized or eliminated.

In this process, a commercially available caustic scrubber is used to remove the sulfur dioxide. A mixture of lime (calcium oxide, a strong caustic) or sodium hydroxide (lye, a very strong caustic) and water is sprayed through the exhaust gas. This liquid chemically reacts with the acid gases such as sulfur dioxide, hydrogen chloride, etc. to remove the acid gases. Plastic or ceramic open-frame balls are used as packing to increase the surface area of the contact surface to improve the efficiency of the chemical reaction. After the liquid has reacted with the gas, the gas stream passes through a series of impediments, called demisters to remove all excess liquid.

Acid gas scrubber technology is mature and well represented by many manufacturers. Little has changed with this technology since the early 1980s.

Carbon Monoxide

Carbon Monoxide (CO) is the result of incomplete combustion. This is due to either low combustion temperatures or insufficient oxidation. In the combustor of this invention, the combustion temperature exceeds 3,000° F. for all solid fuels and up to 4,000° F. using tires. To ensure that the combustion process is complete and no carbon monoxide remains, a small amount of excess oxygen is added to the final stage of combustion. This results in negligible concentrations of carbon monoxide. Any unreacted carbon monoxide passes through the entire pollution control system and is reintroduced into the combustor as part of the diluent carbon dioxide where complete oxidation of the carbon monoxide can occur.

Volatile Hydrocarbons

Volatile hydrocarbons or volatile organic carbons (VOC) are a class of compounds that are regulated by the Environmental Protection Agency. These compounds include a wide range of chemicals that can be emitted into the atmosphere. Included in this list are compounds like dioxins, polychlorinated biphenyls (PCBs), polynuclear aromatics (PNAS) and other hazardous air pollutants (HAPS).

These compounds are created as the result of incomplete combustion. In the combustor of this invention, the formation of these compounds are kept to an extremely low level, in many cases unmeasurable due to the extreme temperatures present in the combustion process.

Carbon dioxide

Carbon dioxide ($CO_2$) is considered to be a greenhouse gas that has the potential of affect the temperature of the Earth's atmosphere. All combustion processes involving hydrocarbons including this process produce carbon dioxide as a byproduct. Virtually all combustion processes emit carbon dioxide into the atmosphere as a pollutant. Currently many regulatory agencies including the United States Environmental Protection Agency (US-EPA) are promulgating regulations to remove or sequester the emitted carbon dioxide from combustion sources.

This invention uses cryogenic (low temperature) collection of the carbon dioxide to remove it from the gas stream. A commercially available process compresses and cools the gas stream, causing the carbon dioxide to precipitate as a liquid where it is separated and collected. The small amount of gases remaining after collection of the carbon monoxide, primarily unreacted sulfur dioxide and unreacted carbon monoxide are returned to the combustor in the diluent gas.

Most of the collected liquefied carbon dioxide is utilized as a commodity but a small percentage is reused as a diluent gas in the combustion process to moderate the combustion temperatures created by the use of pure oxygen as an oxidant.

Monitoring of Pollutants

Regulations in all states and in most countries require a facility that emits air pollutants into the atmosphere to demonstrate that they are complying with the applicable air emission standards. To demonstrate compliance, a facility must usually install a system that continuously monitors the quality of the gas being released into the atmosphere. The system is called a Continuous Emission Monitoring System (CEMS). This is not required for this invention since no air pollutants are emitted into the environment.

Combustor Control Description (FIGS. 9A, 9B and 9C)

The combustion control process is a series of nested control loops that provide the necessary regulation of heat production.

The primary loop that controls the heat production is regulated by the quantity of fuel that is admitted to the combustor. The fuel feed must have a wide range of quantities due to the variety of fuels used in the combustor.

Within the primary loop are combustion control loops that regulate the combustion process in Stages 1a, 1b and Stage 2. This is controlled by the speed of the combustion belts and the quantity of oxidant and diluent added to the fuel as it is combusted. The goal of these control loops is to have the fuel completely consumed while maintaining the required pollution control.

All of the components controlled in the combustion system contain feedback to inform the control system if a component malfunctions. Different component types use different types of feedback; for example, the air control dampers include a position sensor so that the damper position set by the controller is returned to the controller. If the position of the damper differs from the setpoint, the operator is informed and if the error is beyond a certain limit, the combustor is shut down.

Where possible, the control system is designed so that minor component malfunctions are either self-corrected or the programming compensates for the error. If minor errors are noted by the control system, the system operator and system maintenance personnel are notified for repair or replacement. This gives the control system a great deal of intelligence including, where possible, predictive failures.

In summary, the following parameters are used to control the combustion process:

Stage 1a:
Solid fuel feed rate,
Oxygen and diluent flow rate,
Firebelt 30 speed,
Gasification temperature,
Draft pressure,
Infrared flame strength,
Ultraviolet flame strength.

Stage 1b:
Oxygen and diluent flow rate,
Oxygen and combustible gases concentration,
Firebelt 31 speed,
Oxidation temperature,
Draft pressure,
Infrared flame strength,
Ultraviolet flame strength.

Stage 2:
Oxygen and diluent flow rate,
Oxygen concentration,
Carbon monoxide concentration,
Firetube draft pressure,
Firetube temperature,
Infrared flame strength,
Ultraviolet flame strength,
Boiler draft pressure,
Boiler temperature.

Figure 5:
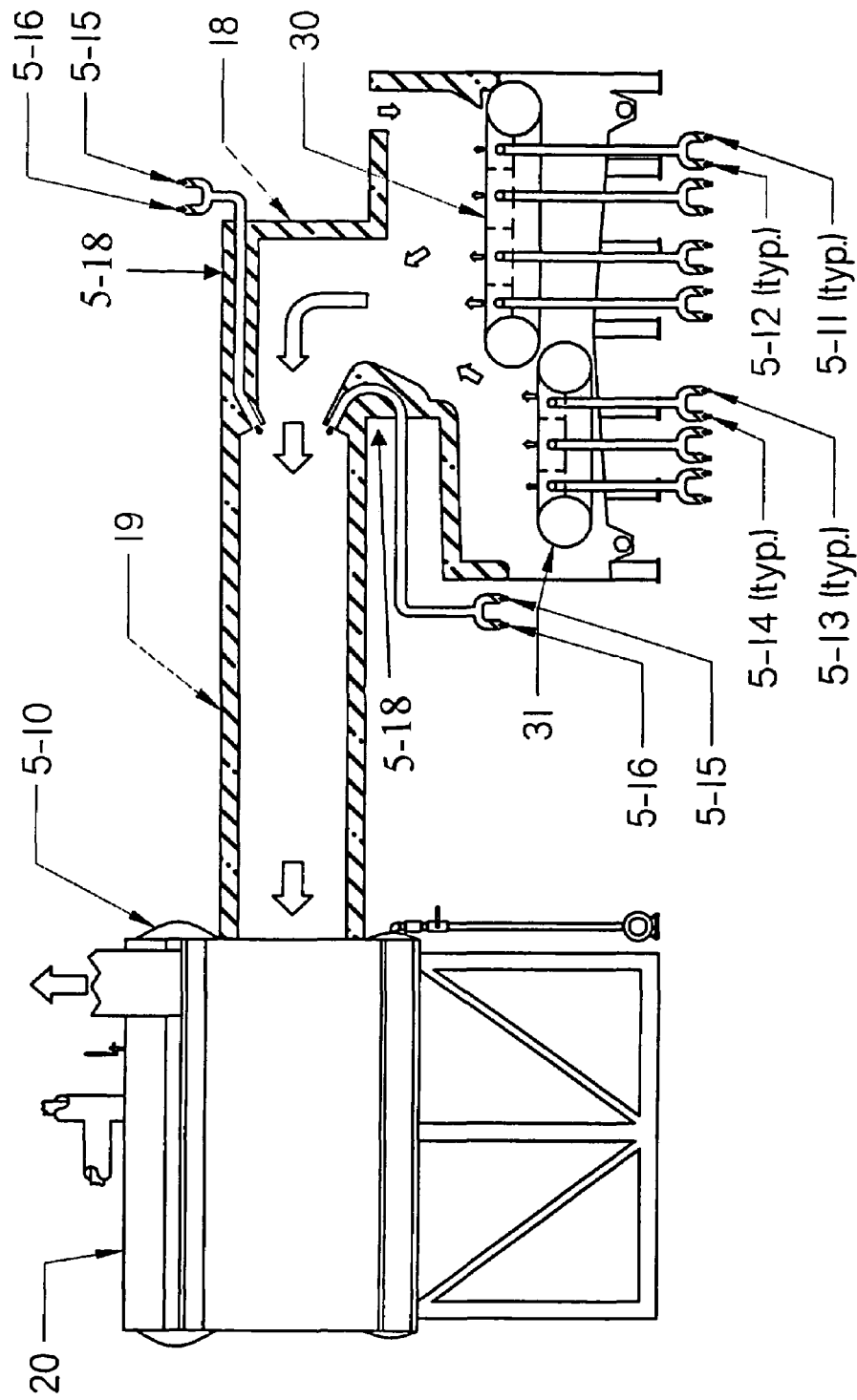
FIG. 5 is a diagrammatic illustration of the boiler for converting thermal energy to steam.
Figure 6:
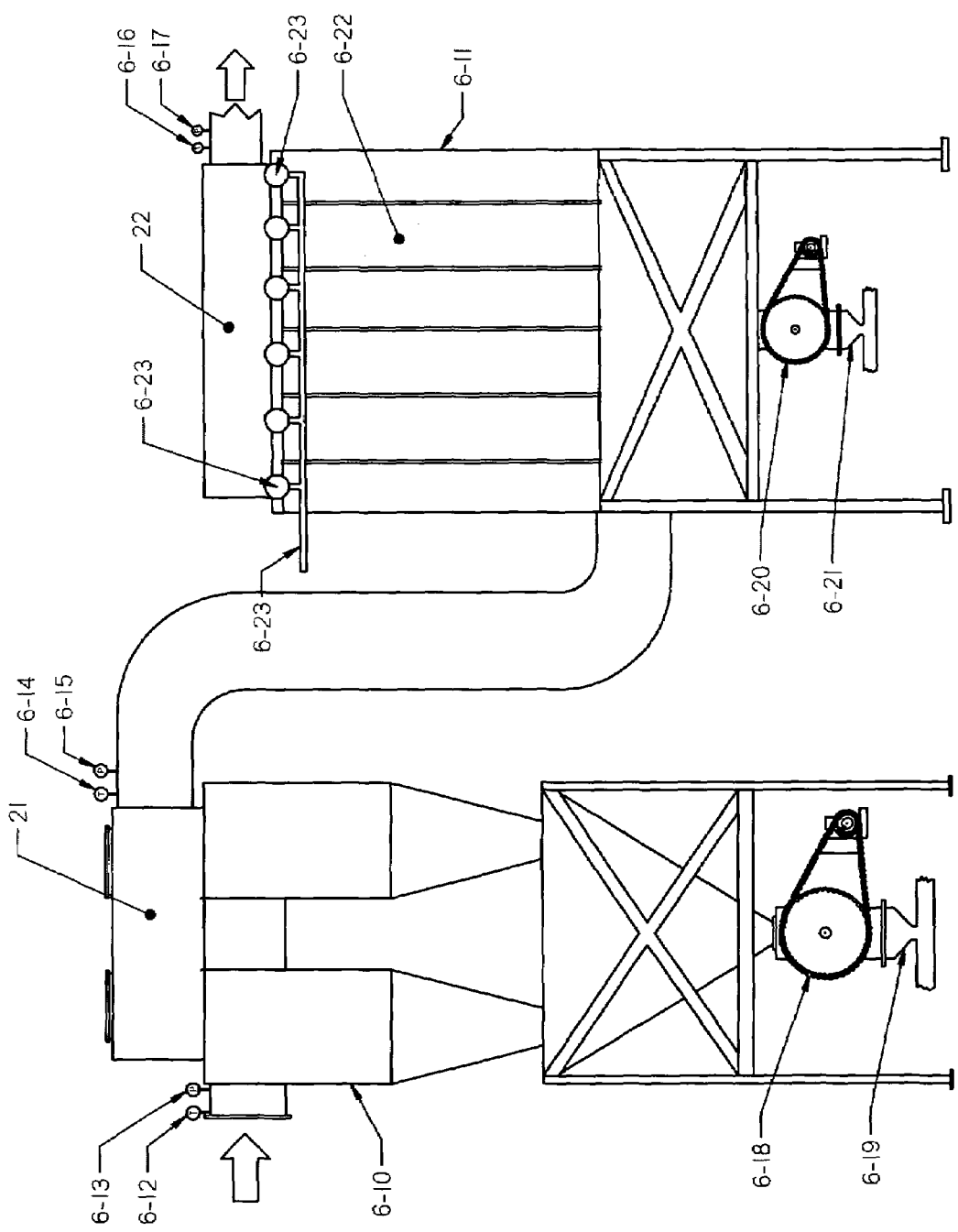
FIG. 6 is a diagrammatic illustration of the cyclone and baghouse particulate collection division.
Figure 7:
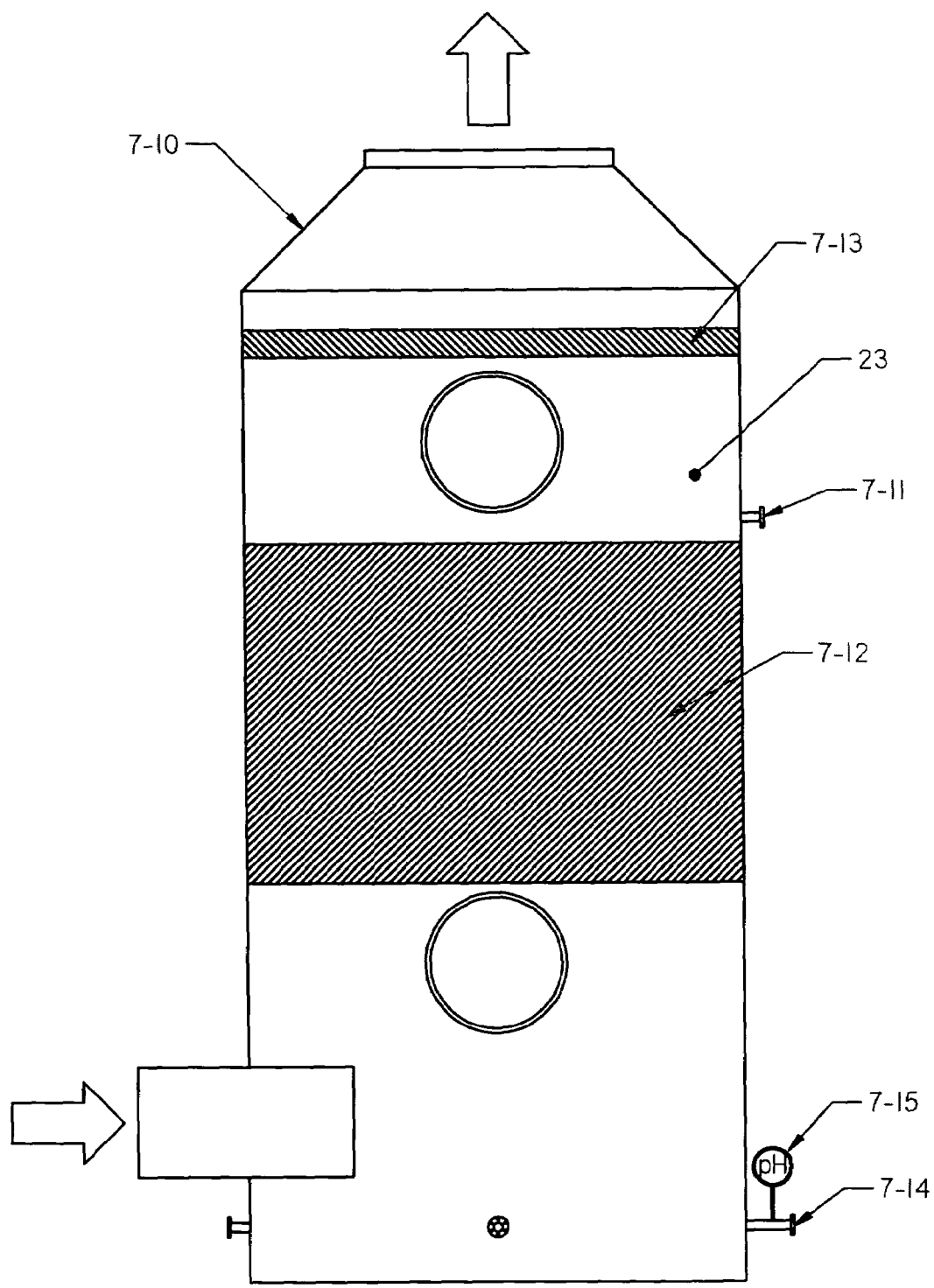
FIG. 7 is a diagrammatic illustration of the scrubber for removing acid gases from the gas stream.

List of Figures and Components
FIG. 1—Process Description
10—air separator unit
11—gas storage for oxygen
12—gas storage for nitrogen
13—gas storage for argon
14—a solid fuel storage unit
15—fuel transport conveyor
16—inlet feed conveyor
17—fuel metering and rotary lock unit
18—gasifier
19—gasifier firetube with connection to boiler
20—boiler
21—cyclone
22—baghouse
23—acid gas scrubber
24—carbon dioxide scrubber
25—carbon dioxide storage system
26—control system
FIG. 2—Air Separator Unit 10
2-10—turbine compressor
2-11—condensing column
2-12—fractionating tower
10—air separator unit 11—gas storage for oxygen
12—gas storage for nitrogen
13—gas storage for argon
FIG. 3—Solid Fuel Storage Unit 14 & Inclined Conveyor 15
3-10—walking floor trailer
3-11—bin conveyor
3-13—walking floor
3-14—monitor or sensor
3-15—monitor or sensor
3-16—monitor or sensor
3-17—monitor or sensor
15—fuel transport conveyor
16—inlet feed conveyor
FIG. 4—Surge Bin & Rotary Air Lock
4-10—bin feeder
4-11—bin feeder chute
4-12—monitor or sensor
4-13—load cells (4 ea.).
17—rotary air lock
FIG. 5—ZEF Combustor & Boiler
5-10—boiler
5-11—firebelt 1 oxygen feed
5-12—firebelt 1 diluent feed
5-13—firebelt 2 oxygen feed
5-14—firebelt 2 diluent feed
5-15—firetube oxygen feed
5-16—firetube diluent feed
30—firebelt 1
31—firebelt 2
FIG. 6—Cyclone & Baghouse
6-10—cyclone
6-11—baghouse
6-12—cyclone inlet temperature sensor
6-13—cyclone inlet pressure sensor
6-14—cyclone outlet temperature sensor & baghouse inlet temperature sensor
6-15—cyclone outlet pressure sensor & baghouse inlet temperature sensor
6-16—baghouse outlet temperature sensor
6-17—baghouse outlet temperature sensor
6-18—cyclone rotary air lock
6-19—cyclone eductor
6-20—baghouse rotary air lock
6-21—baghouse eductor
6-22—baghouse bags
21—cyclone
22—baghouse
FIG. 7—Acid Gas Scrubber
7-10—acid gas scrubber
7-11—caustic spray system
7-12—plastic or ceramic packing material
7-13—demister
7 14—spent slurry collector
7-15—pH sensor
23—acid gas scrubber
FIG. 8—Carbon Dioxide Scrubber
8-10—carbon dioxide scrubber
8-11—turbine compressor
8-12—condensing column
8-13—fractionating tower
8-14—vent to combustor
24—carbon dioxide scrubber
25—liquefied carbon dioxide storage vessel.

While the invention has been described in relation to preferred embodiments of the invention, it will be appreciated that various other embodiments, adaptations and modifications of the invention will be readily apparent to those skilled in the art.

What is claimed is:

1. In a biomass combustion system for converting biomass to energy and useful products, a combustion method comprising feeding said biomass into a combustion chamber through an airlock and supplying oxygen and a nitrogen-free diluent to said biomass to control the combustion process in said combustion chamber and wherein said nitrogen-free diluent gas is selected from carbon dioxide and argon and mixtures thereof.

2. In a biomass combustion system for converting biomass to energy and useful products, a combustion method comprising feeding said biomass into a combustion chamber through an airlock and supplying oxygen and a nitrogen-free diluent to said biomass to control the combustion process in said combustion chamber, including the step of collecting and passing combustion gas from said combustion chamber through a firetube and adding more oxygen and a diluent gas to control the burning of said combustion gas to produce heat, supplying said heat to a boiler to convert the heat to steam.

3. The method defined in claim 2 including passing residual gases through a cyclone to remove and collect coarse fly-ash and supplying any residual exhaust gas to a baghouse to remove and collect fine fly-ash therefrom and feeding gases from said baghouse to an acid gas scrubber to collect and remove said gas salts, and feeding gases to a carbon dioxide scrubber to remove carbon dioxide therefrom and feeding the carbon dioxide from said carbon dioxide scrubber to a liquifier to liquify carbon dioxide and
feeding said carbon dioxide from said carbon dioxide scrubber to said first combustion stage to as a diluent gas.

4. A system for converting solid biomass material to usable heat energy and related byproducts comprising in combination:
an air separator for separating oxygen from air and providing a supply of oxygen,
a solid fuel combustion chamber having a first chamber portion with an airlock inlet feed for feeding a metered amount of solid fuel thereto, said first burner stage having a first traveling conveyor firebelt and means for feeding oxygen from said supply along the length of said first traveling conveyor firebelt,
a second burner stage having a second traveling conveyor firebelt and means for feeding oxygen from said supply along the length of said second traveling conveyor firebelt,
a third burner stage constituting a steam boiler having a firetube for collecting fuel gases from said first burner and said second burner stages and combusting the collected fuel gases with oxygen from said separator and means to generate steam from the heat of combustion in said third burner stage and a heat utilization device connected to said steam boiler.

5. The system defined in claim 4 including means to add a controlled amount of a nitrogen-free diluent gas to oxygen in the combustion chamber and to moderate the burning temperatures to prevent overheating of the refractory and boiler components.

6. The system defined in claim 5 wherein said diluent gas is carbon dioxide from said separator.

7. The system defined in claim 6 wherein the amount of said diluent added is controlled by the firetube and boiler temperatures, respectively.

8. A zero emission solid fuel fed combustion system comprising an air separator for separating oxygen from air and providing a supply of oxygen, a solid fuel combustion chamber having a first chamber portion with an airlock inlet feed for feeding a metered amount of a solid fuel thereto, a first burner stage having a first traveling conveyor firebelt, means for feeding oxygen from said supply in progressively increasing proportions along the length of the first traveling conveyor firebelt, a second burner stage having a second traveling conveyor firebelt fed with oxygen from said supply in a progressively decreasing amount along the length of said second traveling conveyor firebelt, a third burner stage constituting a steam boiler having a collector for collecting fuel gases from said first and second burner stage and combusting the collected fuel gases with oxygen from said separator and means to generate steam from the heat of combustion in said third burner stage, and a utilization device connected to said steam boiler.

* * * * *